(12) United States Patent
Nielsen et al.

(10) Patent No.: US 7,755,618 B2
(45) Date of Patent: Jul. 13, 2010

(54) IMAGE PROCESSING APPARATUS AND IMAGE PROCESSING METHOD

(75) Inventors: Frank Nielsen, Tokyo (JP); Shigeru Owada, Chiba (JP)

(73) Assignee: Sony Corporation (JP)

( * ) Notice: Subject to any disclaimer, the term of this patent is extended or adjusted under 35 U.S.C. 154(b) by 45 days.

(21) Appl. No.: 11/386,285

(22) Filed: Mar. 22, 2006

(65) Prior Publication Data
US 2006/0256114 A1 Nov. 16, 2006

(30) Foreign Application Priority Data
Mar. 31, 2005 (JP) .............................. 2005-104375

(51) Int. Cl.
G06T 15/00 (2006.01)
G06K 9/36 (2006.01)

(52) U.S. Cl. ...................................... 345/419; 382/285

(58) Field of Classification Search ................. 345/424, 345/419, 420, 427; 382/285
See application file for complete search history.

(56) References Cited

U.S. PATENT DOCUMENTS

| | | | |
|---|---|---|---|
| 5,649,080 A * | 7/1997 | Minakata | 345/427 |
| 7,061,484 B2 * | 6/2006 | Bailey et al. | 345/419 |
| 2005/0110791 A1 * | 5/2005 | Krishnamoorthy et al. | 345/419 |

FOREIGN PATENT DOCUMENTS

JP 09-237352 9/1997
JP 2002-306480 10/2002

OTHER PUBLICATIONS

Hong et al., "Virtual Voyage: Interactive Navigation in the Human Colon", 1997.*
Lorensen et al., "Marching Cubes: A High Resolution 3D Surface Construction Algorithm", 1987, ACM; pp. 163-169.*
Tzeng, Fan-Yin et al., "A Novel Interface for Higher-Dimensional Classification of Volume Data", In Proceedings of IEEE Visualization 2003, IEEE, pp. 505-512.
Sherbondy, Anthony et al., "Fast Volume Segmentation with Simultaneous Visualization Using Programmable Graphics Hardware", In Proceedings of IEEE Visualization 2003, IEEE, pp. 171-176.
Miyamoto et al., "Development of a Method for Generation Virtual Laparoscopic Views Based on Extraction of Abdominal Wall from 3D Abdominal CT Images and Volumetric Image Deformation", 8 pages, (2005).
Office Action from corresponding Japanese Patent Application No. 2005-104375. Does not have English translation.

* cited by examiner

*Primary Examiner*—Ryan R Yang
(74) *Attorney, Agent, or Firm*—Lerner, David, Littenberg, Krumholz & Mentlik, LLP (57) ABSTRACT

There is provided an image processing apparatus and its method allowing a user to specify a desired 3D area without cutting volume data. The present invention provides an image processing apparatus specifying a desired 3D area on volume data, which includes a display section that displays the volume data, an input section that a user inputs a 2D path for the volume data displayed on the display section, a path rendering section that converts the 2D path into a 3D path according to analysis of relation between the 2D path and volume data, and a 3D area specification section that specifies the desired 3D area based on the 3D path.

5 Claims, 7 Drawing Sheets
(4 of 7 Drawing Sheet(s) Filed in Color)

IMAGE PROCESSING APPARATUS AND IMAGE PROCESSING METHOD

CROSS REFERENCE TO RELATED APPLICATIONS

The present invention contains subject matter related to Japanese Patent Application JP 2005-104375 filed in Japanese Patent Office on Mar. 31, 2005, entire contents of which being incorporated herein by reference.

BACKGROUND OF THE INVENTION

The present invention relates to an image processing apparatus and its method suitably used when a user specifies a region of interest (ROI) on volume data.

Volume segmentation is image processing that splits volume data obtained using, e.g., CT (Computerized Tomography) or MRI (Magnetic Resonance Imaging) into several visually perceptual or semantic units. This volume segmentation is indispensable for obtaining useful information such as shape or cubic volume from unprocessed volume data and therefore has been studied for about thirty years. However, no fully automated method is yet available. This is because that high level information processing that covers a wide range of information from low-dimensional information such as edge detection and texture analysis to high-dimensional information such as the entire shape or topology of an object is required in order to obtain a segmentation result that a user expects. In particular, it is thought that it is impossible to automatically generate the high-order information without user's instruction.

SUMMARY OF THE INVENTION

The main problem is how to give such information to an apparatus. In the case of 2D image data, a user can directly specify a desired area with a mouse. However, a mouse provides only 2D information. Thus, in the case of 3D volume data, it is difficult for a user to specify a desired 3D area with a mouse.

In a conventional technique, a user cuts volume data and specifies a desired 3D area on its cross-section (refer to, for example, Tzeng, F.-Y., Lum, E. B., and Ma, K.-L., 2003, "A novel interface for higher-dimensional classification of volume data.", In Proceedings of IEEE Visualization 2003, IEEE, 505-512, and Sherbondy, A., Houston, M., and Napel, S., 2003, "Fast volume segmentation with simultaneous visualization using programmable graphics hardware.", In Proceedings of IEEE Visualization 2003, IEEE, 171-176). However, in the above technique, the user cannot specify a desired area without cutting the volume data, making the specification process complicated.

The present invention has been proposed in view of the conventional situation, and it is desirable to provide an image processing apparatus and its method allowing a user to specify a desired 3D area without cutting volume data.

According to the present invention, there is provided an image processing apparatus specifying a desired 3D area on volume data, including: a display means for displaying the volume data; an input means for a user to input a 2D path for the volume data on the display means; a path rendering means for converting the 2D path into a 3D path according to analysis of relation between the 2D path and volume data; and a 3D area specification means for specifying the desired 3D area based on the 3D path.

Further, there is provided an image processing method specifying a desired 3D area on volume data, including: an input step of inputting a 2D path that a user has drawn for volume data displayed on a display means; a path rendering step of converting the 2D path into a 3D path according to analysis of relation between the 2D path and volume data; and a 3D area specification step of specifying the desired 3D area based on the 3D path.

According to the image processing apparatus and its method, it is possible to specify a desired 3D area by directly drawing a 2D path on a plane displaying volume data without cutting the volume data.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1A:
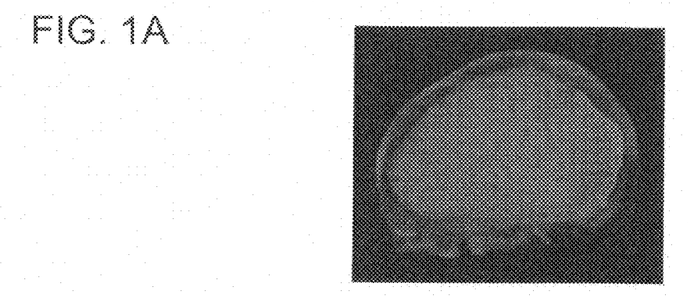
FIGS. 1A and 1B are views showing an example of volume segmentation according to the embodiment of the present invention.
Figure 1B:
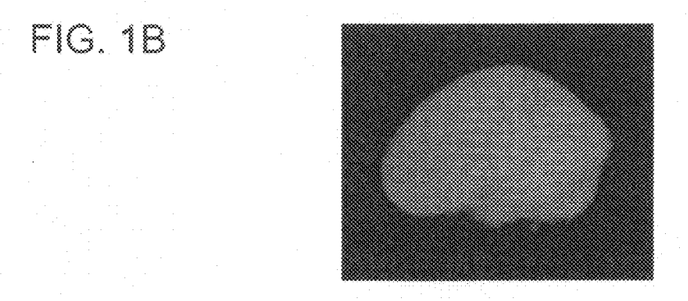

A concrete embodiment of the present invention will be described below in detail with reference to the accompanying drawings. In the embodiment, the present invention is applied to an image processing apparatus that extracts a desired segmentation area from volume data. According to this image processing apparatus, when a user draws a 2D path along the contour of the brain on 105×73×78 voxel head MRI data as shown in FIG. 1A, the apparatus automatically computes the depth of the path and extracts the entire contour of the brain, as shown in FIG. 1B.

Figure 2:
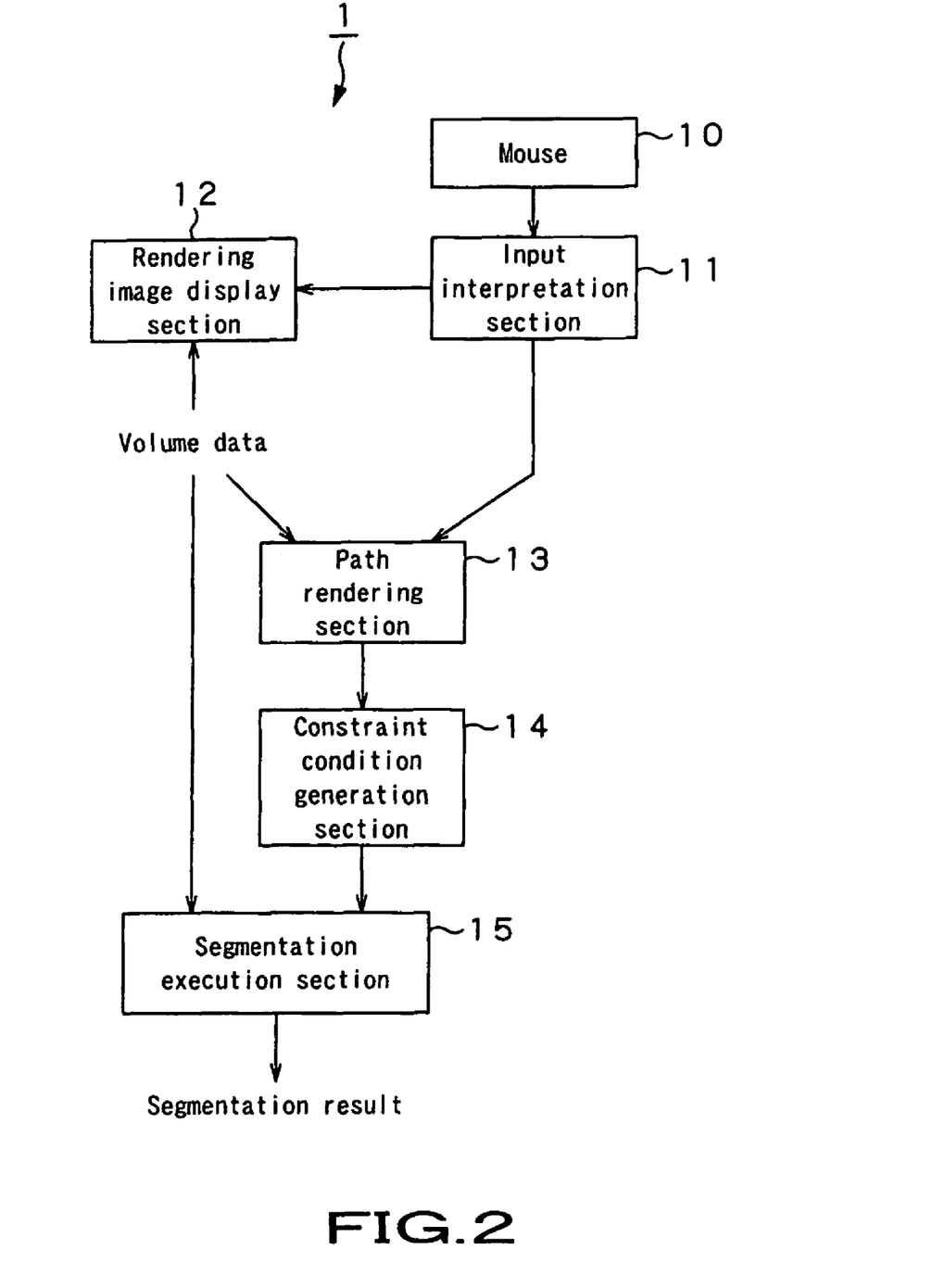
FIG. 2 is a view showing a schematic configuration of an image processing apparatus according to the embodiment of the present invention.

FIG. 2 shows a schematic configuration of the image processing apparatus according to the embodiment. As shown in FIG. 2, an image processing apparatus 1 according to the embodiment of the present invention includes an input interpretation section 11 which interprets an input from a mouse 10, a rendering image display section 12 which renders (visualizes) input volume data based on display parameters supplied from the input interpretation section 11, a path rendering section 13 which adds a depth to a 2D path (stroke) supplied from the input interpretation section 11 to convert the 2D path into a 3D path, a constraint condition generation section 14 which generates, based on the 3D path, constraint condition applied when segmentation is performed, and a segmentation execution section 15 which executes segmentation of volume data based on the constraint condition.

When the user operates the image processing apparatus 1 using the mouse 10, the input interpretation section 11 determines whether the input from the mouse 10 indicates display parameters such as rotation or segmentation area information.

In the former case, that is, when the user sets display parameters of volume data displayed in the rendering image display section 12, the input interpretation section 11 supplies the rendering image display section 12 with the display parameters of the volume data. The rendering image display section 12 applies rotation or the like to the volume data based on the display parameters and displays the resultant volume data.

In the latter case, that is, when the user draws a 2D path on a plane of the rendering image display section 12 where the volume data is displayed, the input interpretation section 11 supplies the path rendering section 13 with the 2D path. The path rendering section 13 adds a depth to the 2D path to convert the 2D path into a 3D path. The constraint condition generation section 14 then generates constraint condition applied when segmentation is performed based on the rendered path. The segmentation execution section 15 executes segmentation of the volume data based on the constraint condition and outputs a segmentation result.

Processing performed in the path rendering section 13, constraint condition generation section 14, and segmentation execution section 15 will hereinafter be described in detail.

The path rendering section 13 adds a depth to a 2D path that a user has drawn on volume data to convert the 2D path into a 3D path. It is assumed that the contour of the segmentation area is distinct visually and that the user's stroke traces the contour of the segmentation area closely. If this assumption is valid, the 3D path should be close to the silhouette of the segmentation area. In other words, a gradient vector (direction in which a variation in the brightness value is highest) of the volume data is almost perpendicular to the view direction. The path rendering section 13 computes such a 3D path as follows.

Figure 3A:
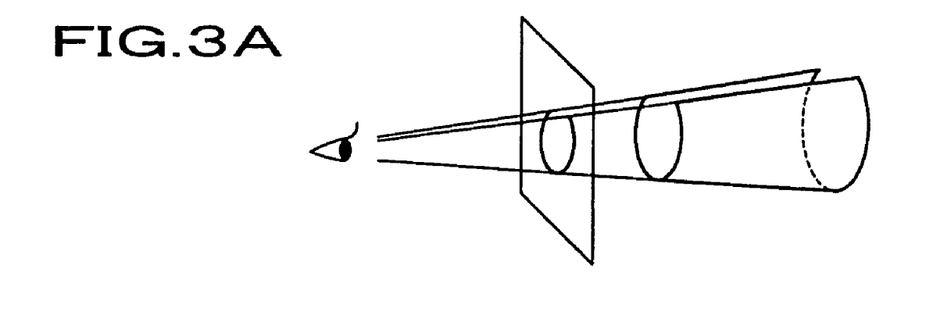
FIGS. 3A to 3E are views showing a process of adding a depth to a 2D path drawn on volume data to convert the 2D path into a 3D path.

The path rendering section 13 sweeps the 2D path along the depth direction to create a 3D curved surface (hereinafter, referred to as "sweep surface") as shown in FIG. 3A.

The path rendering section 13 then assigns the x coordinate axis to the depth direction of the sweep surface and the y coordinate axis to the direction parallel to the display surface of the rendering image display section 12. That is, x=0 along the edge of the sweep surface on the near side of the viewpoint and $x=X_{max}$ along the edge of the sweep surface on the far side of the viewpoint; and y=0 along the straight edge corresponding to the starting point of the 2D path and $y=Y_{max}$ along the straight edge corresponding to the end point of the 2D path.

Figure 3B:
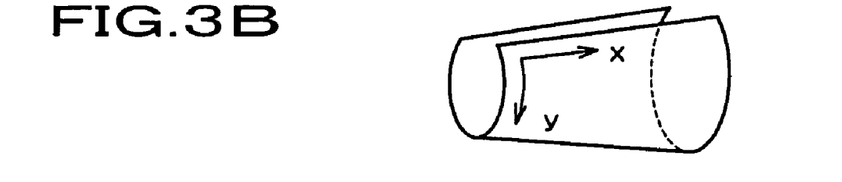

The path rendering section 13 then sets sampling points on the sweep surface. Sampling points are lattice points in the parameter space. In the following context, each lattice point is denoted by $L_{ij}$. i, j are indices along the x and y directions ($1 \leq i \leq X_{max}$, $1 \leq j \leq Y_{max}$).

Figure 3C:
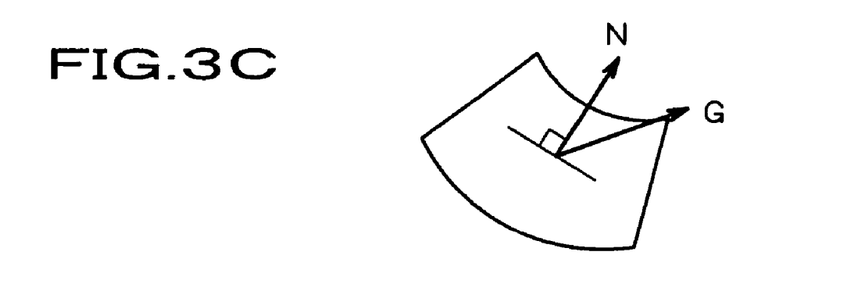

The path rendering section 13 then compute a silhouette coefficient $S_{ij}=|N_{ij} \cdot G_{ij}|$ on each lattice point $L_{ij}$. As shown in FIG. 3C, $N_{ij}$ is a normalized normal vector of the sweep surface while $G_{ij}$ is a normalized gradient of the volume data. The silhouette coefficient $S_{ij}$ indicates how much the point looks like a silhouette from the current viewpoint.

The gradient $G_{ij}$ of the volume data is computed as follows. If the original volume data contains color channels (R, G, B), the path rendering section 13 first converts the color values into grayscale values using the equation Gray=α×(0.299×Red+0.587×Green+0.114×Blue). If the original volume value has been filtered using the transfer functions, the post-filtered value is used.

A differential filter is used in an actual computation of the gradient. This is done by computing the forward difference between adjacent voxels. Assuming that the volume data is represented by V (x, y, z) and distance between adjacent voxels is Δt, the gradient is represented by a 3D vector (1/Δt)× (V(x+Δt, y, z)−V(x, y, z), V(x, y+Δt, z)−V(x, y, z), V(x, y, zΔt)−V(x, y, z)). However, in the case where volume data contains a minute structure (high frequency component), when the volume data is used without change to compute its gradient, minute variations in the data may make a result of the gradient computation unstable. In order to cope with this, it is preferable to apply smoothing to the volume data for removal of high frequency components before computation of the gradient. The application of smoothing can be done by performing convolution using a 3D Gaussian function. Since differentiating a result obtained by performing convolution using a Gaussian function is equivalent to performing convolution using a differentiated Gaussian function, it is also possible to use another method that previously compute a filter with a Gaussian function which has been differentiated in respective x, y, and z directions and then perform convolution using the computed filter. The radius R of a smoothing kernel is allowed to dynamically change in accordance with the size of the volume data on the rendering image display section 12. At this time, inaccuracy of a 2D path that the user has drawn is absorbed, so that it is preferable to reduce the radius R of a smoothing kernel more as the enlargement factor of the volume data becomes more increased.

Figure 3D:
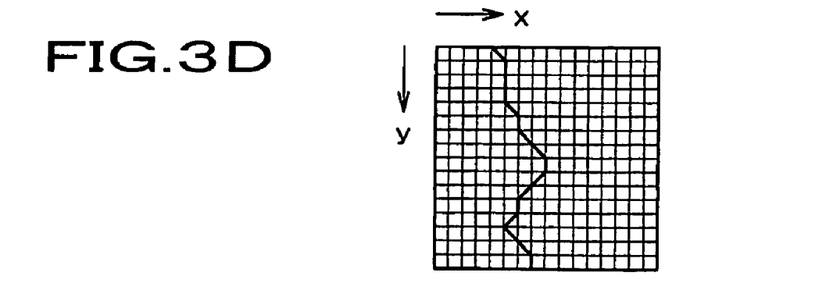

Subsequently, the path rendering section 13 computes the depth of a 2D path that the user has drawn on the volume data. The problem of computing the depth of the user-drawn 2D path is now the problem of finding a path on the each lattice that starts from a point on the edge y=0 and ends at a point on the edge $y=Y_{max}$, where the sum of the silhouette coefficients along the path is maximized, as shown in FIG. 3D. As this path has only one x value for each y, it is represented as a function x=f(y). To maintain the continuity of the path, the condition that $|f(yi)-f(yi+1)| \leq c$ (for example, c=1) is imposed. An additional condition of $|f(y1)-f(y_{max})| \leq c$ is imposed for a closed stroke. In order to solve this problem, dynamic programming is used. For an open path, the dynamic programming is performed only once while for closed stroke, it must be performed by the numbers of sample points along the edge x, to satisfy the additional condition $|f(y1)-f(y_{max})| \leq c$.

Figure 3E:
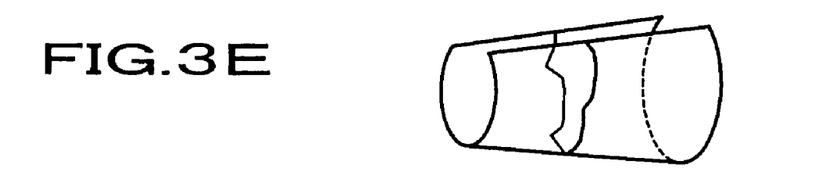
Figure 4:
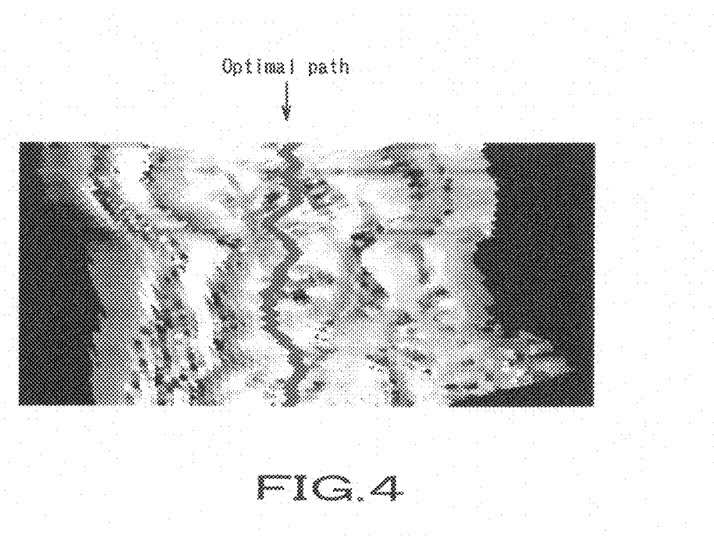
FIG. 4 is a view showing a silhouette coefficient lattice used when the entire contour of a brain is extracted from the volume data shown in FIG. 1 and found optimal path.

Finally, as shown in FIG. 3E, the path rendering section 13 gives corresponding 3D points to the optimal path found on the parameter space to generate a 3D path. The silhouette coefficient lattice for use in extracting the entire contour of the brain from the volume data and found optimal path is shown in FIG. 4.

Figure 5A:
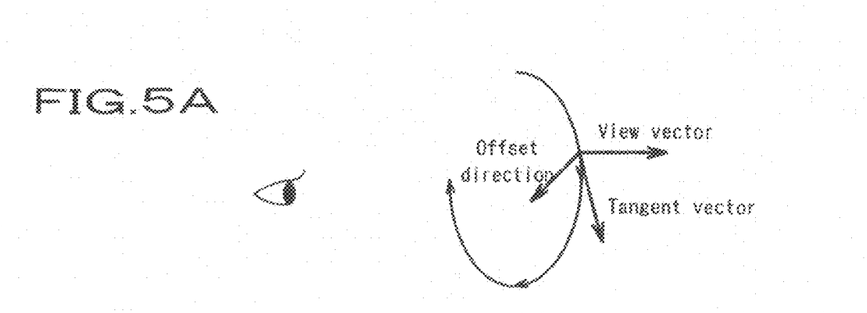
FIGS. 5A and 5B are views showing a process of generating a set of constraint points based on a 3D path in performing segmentation.
Figure 5B:
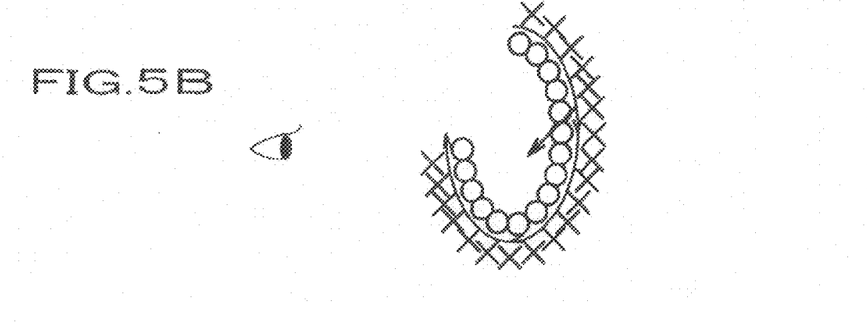
Figure 6:
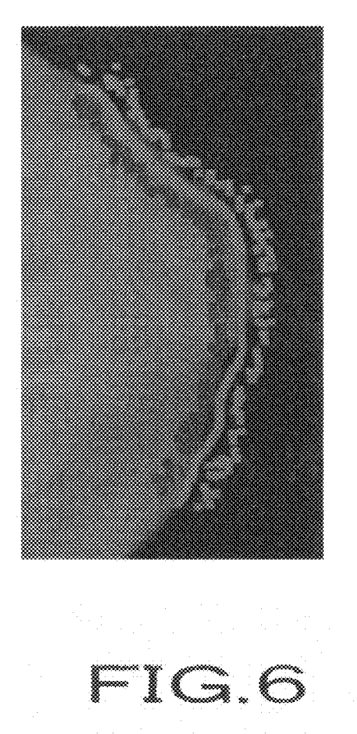
FIG. 6 is a view showing a set of constraint points for the volume data of FIG. 1.

After the 2D path has been converted into a 3D path as described above, the constraint condition generation section 14 generates a set of constraint points as constraint condition applied when segmentation is performed. The set of constraint points specifies foreground and background regions and is generated at a position obtained by offsetting the 3D path. The offset direction ventor, D, is obtained simply by computing a cross-product of the view vector and the tangent vector of the 3D path, as shown in FIG. 5A. The displacement extent e is proportional to the radius R of the smoothing kernel. Each point in the 3D path is offset by ±e×D/|D| and the points on the right hand side become foreground constraint points (denoted by O) and those on the left hand side become background constraint points (denoted by x). The constraint points generated for the volume data shown in FIG. 1 are shown in FIG. 6.

After the generation of the foreground and background constraint points, the segmentation execution section 15 executes segmentation of the volume data based on the set of constraint points and outputs a segmentation result. Various methods can be used to perform segmentation, such as one described in the document [Nock, R. and Nielsen, F., 2004, "Grouping with bias revisited.", In IEEE International Conference on Computer Vision and Pattern Recognition, IEEE CS Press, A.B.L, -S. Davis, R. Chellapa, Ed., 460-465]. To perform segmentation most simply, the average of color vectors (R, G, B) on the points defined as foreground and average of color vectors (R, G, B) on the points defined as background are computed, and the color vector on each voxel is determined to be foreground or background based on whether the distance between the color vector on each voxel and the computed average of foreground color vectors or the distance between the color vector on each voxel and the computed average of background color vectors is shorter. Euclidean distance technique can be used for the above determination.

An example in which the present invention is applied to actual volume data will be described below.

Figure 7A:
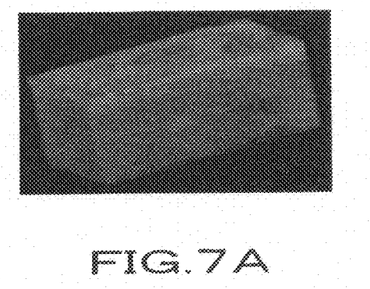
FIGS. 7A to 7F are views showing a result of segmentation performed for actual volume data.
Figure 7B:
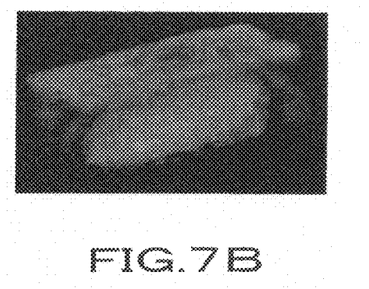
Figure 7C:
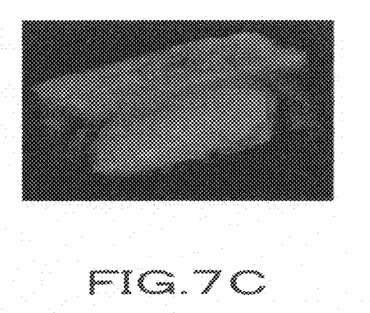
Figure 7D:
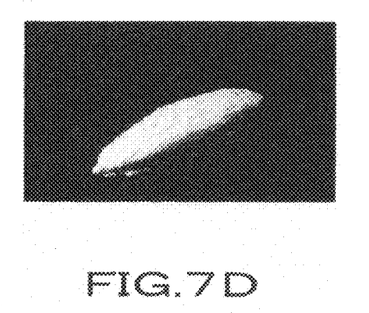
Figure 7E:
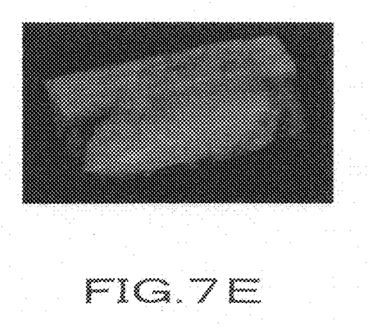
Figure 7F:
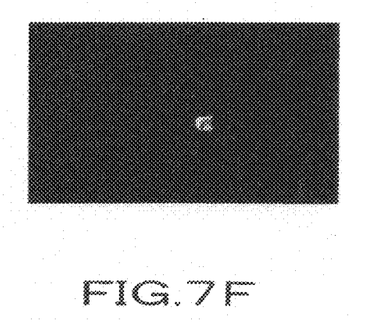

In this example, as shown in FIG. 7A, a chocolate crisp containing almond was fixed by an embedding agent called OCT compound, and was cut into 42 μm slices to obtain 126×89×53 voxel volume data. The transfer function was then applied to the obtained volume data to allow the almond to be seen easily as shown in FIG. 7B. When a 2D path was drawn as shown in FIG. 7C, the almond region was segmented and the boundary appeared as shown in FIG. 7D. Further, as shown in FIG. 7E, also when a 2D path was drawn along the contour of small masses on the almond region, the specified contour of small masses could be picked up, as shown in FIG. 7F.

Figure 8:
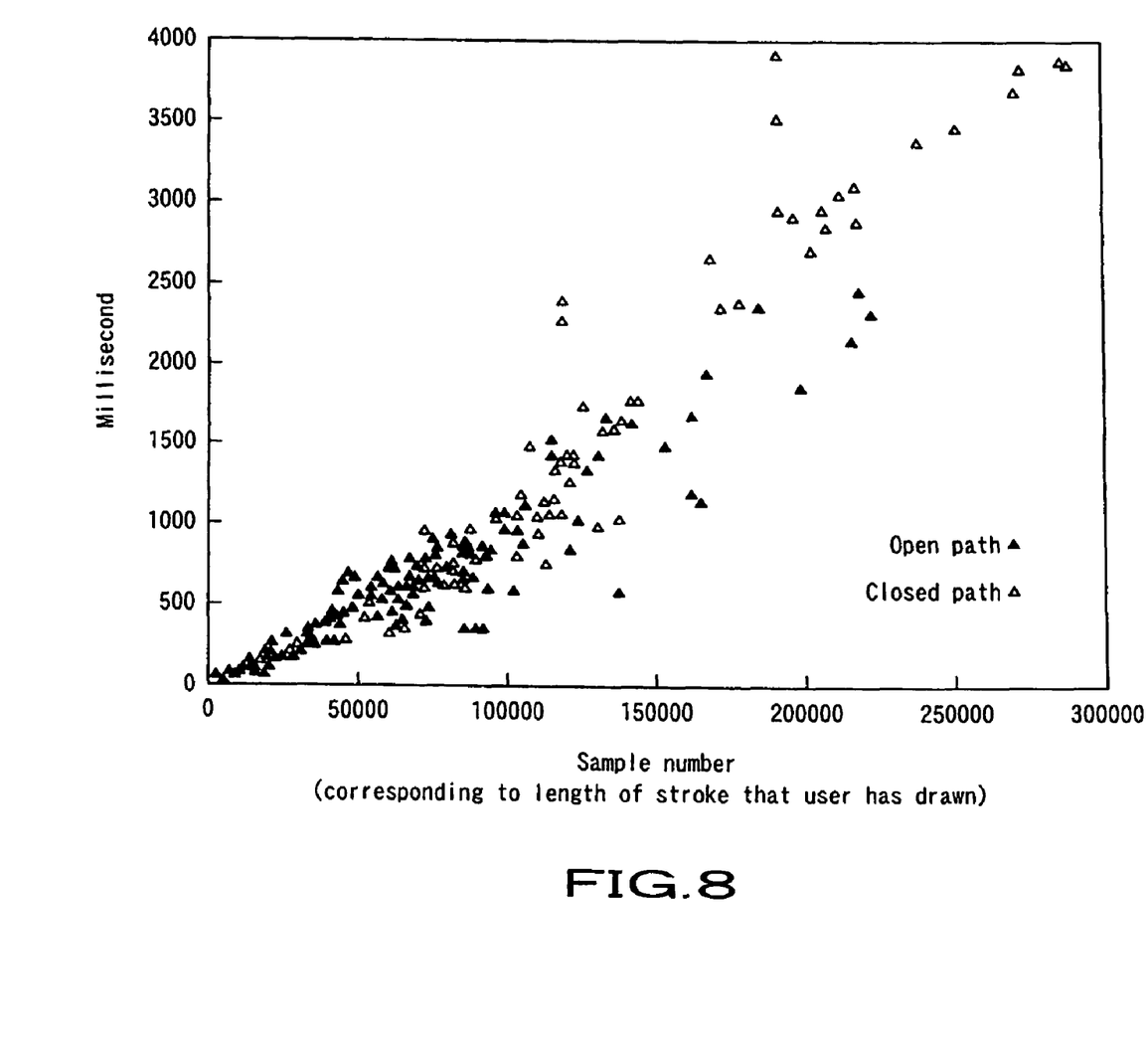
FIG. 8 is a view showing a result of measurement of the execution speed of the image processing apparatus according to the embodiment of the present invention.

To evaluate the speed of the image processing apparatus 1, we asked three subjects to use it. Their task was to select various desired 3D regions 20 times for two datasets (head MRI data shown in FIG. 1A and high-potential iron protein (66×66×66 voxel) volume data), respectively. A result of the above task is shown in FIG. 8. In FIG. 8, the vertical axis represents the elapsed time during which a 2D path is converted into a 3D path and a set of constraint points are generated, while the horizontal axis represents the number (corresponding to the length of the 2D path) of sample points on the sweep surface. We used a desktop computer with an Intel Xeon™ 3.2-GHz processor and 2 GB of RAM.

The chart shown in FIG. 8 shows that the required time is almost proportional to the number of sample points for both open and closed paths, although closed path requires running dynamic programming multiple times. We suppose it is because running time is dominated by the convolution computation for obtaining gradient. In our case, it took 0.5 to 20 seconds to complete segmentation, depending on the segmentation method.

The present invention is not limited to the above embodiment, and various modifications can be made without departing from the scope of the present invention.

For example, although the present invention is used for extraction of a desired segmentation area from volume data in the above embodiment, the present invention is not limited to this, and can also be used for coloring of a desired 3D area on volume data.

It should be understood by those skilled in the art that various modifications, combinations, sub-combinations and alternations may occur depending on design requirements and other factors insofar as they are within the scope of the appended claims or the equivalents thereof.

The invention claimed is:

1. An image processing apparatus specifying a desired 3D area on volume data, comprising:
    display means for displaying the volume data;
    input means for a user to input a 2D line defining a 2D path for the volume data displayed on the display means;
    path rendering means for automatically converting the 2D path into a 3D path according to analysis of relation between the 2D path and volume data;
    additional information generation means for generating a set of points specifying foreground and background regions at a position obtained by offsetting the 3D path by a predetermined distance in the direction of a cross-product of the user's view vector and the tangent vector of the 3D path; and
    3D area specification means for specifying the desired 3D area based on the 3D path and the set of points.

2. The image processing apparatus according to claim 1, wherein the path rendering means sweeps the 2D path along the depth direction as viewed from the user to create a 3D curved surface, as well as, sets a limited number of sampling points in the 3D curved surface, samples attribute values of the volume data on the respective sampling points, and sets scalar values computed from the attribute values and the 3D shape of the 3D curved surface in respective sampling points to obtain the 3D path in the 3D curved surface in which the scalar values have been set using dynamic programming.

3. The image processing apparatus according to claim 2, wherein the scalar value is an inner product of a normalized normal vector on each sampling point and a normalized gradient of the volume data.

4. An image processing method specifying a desired 3D area on volume data, comprising:
    an input step of inputting a 2D line defining a 2D path that a user has drawn for volume data displayed on display means;
    a path rendering step of automatically converting the 2D path into a 3D path according to analysis of relation between the 2D path and volume data;
    an additional information generation step of generating a set of points specifying foreground and background regions at a position obtained by offsetting the 3D path by a predetermined distance in the direction of a cross-product of the user's view vector and the tangent vector of the 3D path; and
    a 3D area specification step of specifying the desired 3D area based on the 3D path and the set of points.

5. An image processing apparatus specifying a desired 3D area on volume data, comprising:
    a display section that displays the volume data;
    an input section that a user inputs a 2D line defining a 2D path for the volume data displayed on the display section;
    a path rendering section that automatically converts the 2D path into a 3D path according to analysis of relation between the 2D path and volume data;
    an additional information generation section that generates a set of points specifying foreground and background regions at a position obtained by offsetting the 3D path by a predetermined distance in the direction of a cross-product of the user's view vector and the tangent vector of the 3D path; and
    a 3D area specification section that specifies the desired 3D area based on the 3D path and the set of points.

* * * * *